Jan. 5, 1926.
A. S. HOWARD
SCRAPER
Filed June 30, 1925
1,568,842
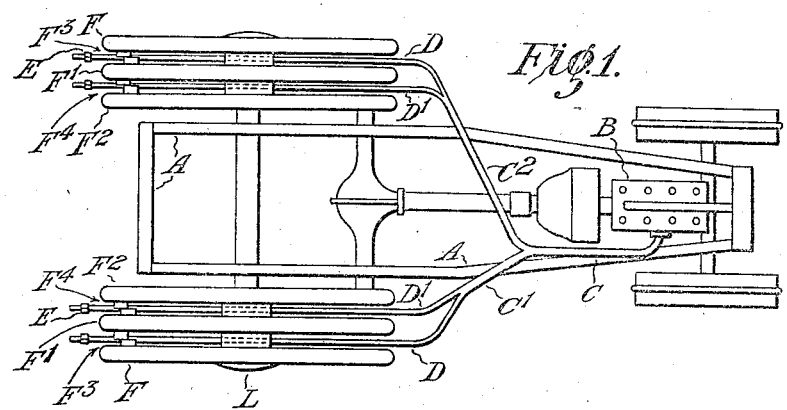
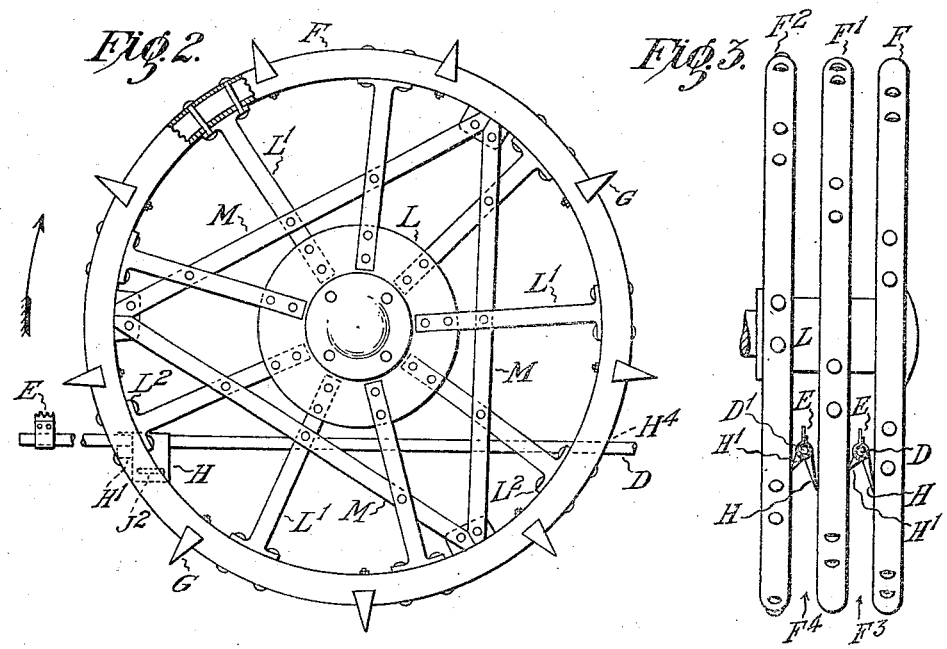
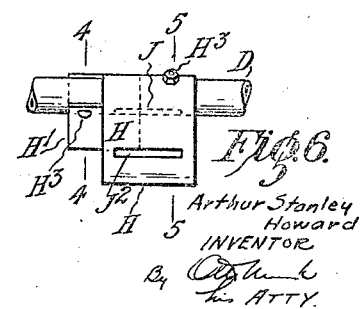
Arthur Stanley Howard
INVENTOR Patented Jan. 5, 1926.

1,568,842

UNITED STATES PATENT OFFICE.

ARTHUR STANLEY HOWARD, OF GOLTON SOUTH, VIA LUVECK, VICTORIA, AUSTRALIA.

SCRAPER.

Application filed June 30, 1925. Serial No. 40,705.

*To all whom it may concern:*

Be it known that I, ARTHUR STANLEY HOWARD, a subject of the King of Great Britain and Ireland, residing at Golton South, via Luveck, in the State of Victoria, Commonwealth of Australia, have invented certain new and useful Scrapers; and I do hereby declare the following to be a full, clear, and exact description of the invention, such as will enable others skilled in the art to which it appertains to make and use the same.

My invention is of the kind having the object of keeping scrapers of wheel tyres and other surfaces relatively free from mud and foreign matter. Not only wheel tyre scrapers, sides, and treads, but plough mould boards, sledges, and so on, under present conditions often become heavy with clogged or accumulated mud which impedes travel and proper functioning. Scrapers have been used, but the efficiency of those known to me is insufficient. But my invention improvements are provided whereby surfaces of scrapers, or like parts are heated, and by means of the heat, mud which would otherwise accumulate upon the surfaces is hindered from doing so. The heat may be derived from any convenient source, but I find that with a vehicle having thereon an engine having an exhaust, utilization of the exhaust heat is practicable, economical, and advantageous generally.

The scrapers may be applied to wheel rim sides but the invention is not limited to that application. A wheel is usable having constructional details adapted to facilitate the scraping; but the construction used may vary, and include ordinary wheels some of which while retaining features hereinafter claimed, have two parallel rims with separate treads.

In the drawings the scales vary. Figure 1 is a diagrammatic plan showing a tractor with wheels each having three treads, (spaced apart) and scrapers, and means to heat the latter.

Figure 2 is a side elevation of parts of the wheel, of Figure 1.

Figure 3 is an end elevation of the parts in Figure 2, omitting the road grips.

Figure 4 is a section on line 4—4, Figure 6.

Figure 5 is a section on line 5—5, Figure 6.

Figure 6 is a face view of two scrapers on an exhaust branch pipe.

A is a chassis, B an engine thereon, C the engine exhaust tube, $C^1$, $C^2$ are primary branches thereof, and D, $D^1$ at each side are secondary branches. The branches are suitably supported, as by straps at E connected to mudguards or other convenient supports not shown. The branches have, if desired, any suitable joints to facilitate disconnection, to allow of personal access to parts of the tractor, or to facilitate assembling, and transport.

Branches D, $D^1$, are shown horizontal, but may be located in any convenient positions passing near wheel faces to be cleaned. These branches are also shown extending between the rims of the respective wheels, and when the wheels have three parallel rims F, $F^1$, $F^2$, as shown, the branches D, $D^1$, pass through spaces $F^3$, $F^4$, between the said rims, and each branch will heat scrapers of parts of two rims.

The drawings show (see Figure 3) a central rim $F^1$ which will be scraped on both sides, and other rims scraped on one side, but the invention is not limited to one-sided scraping of such rims, or to side scraping only. As road grips G are illustrated, scrapers are not shown on the treads having the grips, but in suitable cases scrapers may be applied to treads.

In the case illustrated each rim is hollow, of circular cross section, by way of example, solid rims being usable.

The scrapers H, $H^1$ are of any suitable forms, numbers, sizes, and materials, many variations being well known; simple forms are illustrated, having near each rim side an edge $H^2$ of suitable shape. To locate the scrapers on the branch exhaust pipes in working positions, I show bolts $H^3$ by way of example. Scrapers are of any length found suitable, and those shown are at only one point of each rim, but scrapers could be at other points, as at $H^4$. As mud reaches a scraper it slips off the wheel. The branch exhaust pipes J, $J^1$ each have elongated slots for issue of exhaust to the scraper interior K, (each scraper being hollow) to heat the scraper, the exhaust passing from such interior through an escape elongated slot J², as mud slips off the wheel against a scraper the latter being heated causes the mud to drop away instead of accumulating.

Each rim is connected to the wheel hub L suitably, as by spokes L¹ having lugs L² on the rim; and straps M are shown each secured to several spokes and to a rim, but these are not essential features of wheel design. The three treads act somewhat like a wheel having a very broad tyre, but have the advantage of allowing of numerous scrapers being used. More or less treads could be used. The exhaust is not necessarily wholly devoted to the aforesaid heating, and baffles or exhaust directors which are well known may be used at will in exhaust pipes, it being unnecessary to illustrate the same.

Scraper surfaces may of course be curved or rounded so that the shape helps gravity to operate in the separation of the mud.

By having scrapers which adjoin one another of different lengths, as illustrated, that is reaching surfaces which supply mud at points not directly opposite one another, the supplies of mud do not interfere with one another as they reach and fall away from the scraper surfaces.

I claim:

1. In a vehicle, the combination with a wheel thereof, of a scraper acting against said wheel, and means for heating said scraper.

2. In a vehicle having an engine, the combination with a wheel of the vehicle, of a scraper acting against said wheel, and means for directing the exhaust from said engine into contact with the scraper to heat the latter.

3. In a vehicle, the combination of a hollow scraper for a relatively moving surface, a supply of heated fluid, and means for directing said fluid into said scraper to heat the latter.

4. In a vehicle having an engine, the combination with a wheel of the vehicle, of a hollow scraper acting against said wheel, and means for directing the exhaust from said engine into said scraper to heat the latter.

5. In a vehicle having an engine with an exhaust pipe, the combination with a wheel of the vehicle, of a scraper acting against said wheel, and means for directing the exhaust from said engine into contact with the scraper to heat the latter, said means comprising a conduit leading from said exhaust pipe to said scraper.

6. In a vehicle having an engine with an exhaust pipe, the combination with a wheel of the vehicle of a plurality of scrapers acting against said wheel, and means for directing the exhaust from said engine into contact with the scrapers to heat the latter, said means comprising conduits leading from said exhaust pipe and adapted to carry said scrapers, said conduits being provided with apertures adjacent said scrapers.

7. In a vehicle having an engine with an exhaust pipe, the combination with a wheel of the vehicle, of a plurality of hollow scrapers acting against said wheel, and means for directing the exhaust from said engine into said scrapers to heat the latter, said means comprising conduits leading from said exhaust pipe and adapted to carry said scrapers, said conduits being provided with apertures communicating with the interior of said scrapers.

8. In a vehicle, the combination with a wheel of the vehicle of a hollow scraper acting against said wheel and having inlet and outlet apertures, a supply of heated fluid, and means for directing said fluid through said scraper to heat the latter.

9. In a vehicle, the combination of a pair of hollow scrapers of different lengths for surfaces of the vehicle movable relatively with respect to the scrapers, a supply of said scrapers heated fluid, and a conduit for supporting said scrapers between said surfaces and for directing said fluid to the interior of said scrapers.

10. In a vehicle having an engine with an exhaust pipe, the combination of a pair of hollow scrapers of different lengths for surfaces of the vehicle movable relatively with respect to the scrapers, said scrapers having inlet and outlet apertures, and means for directing the exhaust from said engine through said scrapers to heat the latter, said means comprising a conduit leading from said exhaust pipe to said scrapers and adapted to support the latter between said surfaces, said conduit being provided with apertures communicating with the inlet apertures of said scrapers.

In witness whereof I have hereunto set my hand.

ARTHUR STANLEY HOWARD.